US005259101A

United States Patent [19]

Katz

[11] Patent Number: 5,259,101

[45] Date of Patent: Nov. 9, 1993

[54] METHODS OF MAKING THIN METAL FOIL JEWELRY

[76] Inventor: Ernest Katz, 1755 55th St., Brooklyn, N.Y. 11204

[21] Appl. No.: 979,581

[22] Filed: Nov. 20, 1992

[51] Int. Cl.[5] ............ B23F 13/00

[52] U.S. Cl. ............ 29/160.6

[58] Field of Search ............ 29/160.6; 63/2; 428/152, 687

[56] References Cited

U.S. PATENT DOCUMENTS 1,602,847 10/1926 Dover ............ 63/2

3,667,098 6/1972 Levy ............ 29/160.6

FOREIGN PATENT DOCUMENTS 403140 10/1909 France ............ 63/2

*Primary Examiner*—P. W. Echols

*Attorney, Agent, or Firm*—Helfgott & Karas

[57] ABSTRACT

Thin metal foil jewelry is manufactured by a process which includes initially crimping the foil randomly, and then again crimping the foil while rotating the crimp to bring the sides of the crimp out of the plane of the foil to form peaks and valleys and to cause the foil to assume an arcuate shape. The peaks and valleys and the arcuate shape add rigidity to the thin foil and resist deformation. The jewelry can be further processed to form a bead on the periphery of the foil and/or holes which are formed within the foil to add further rigidity to the foil and to change its appearance.

13 Claims, 2 Drawing Sheets

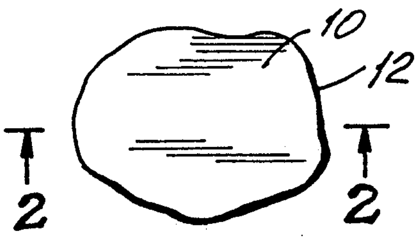
FIG. 1
FIG. 2
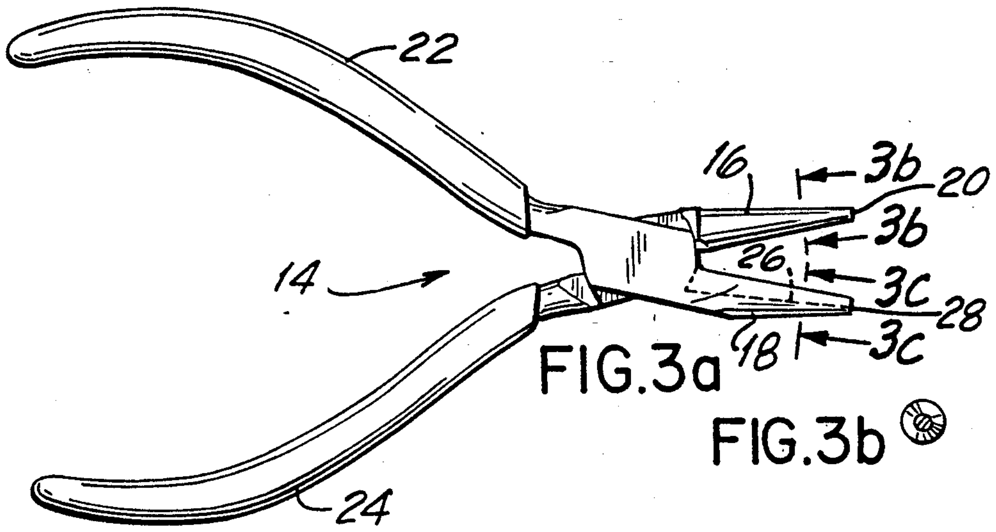
FIG. 3a
FIG. 3b
FIG. 3c
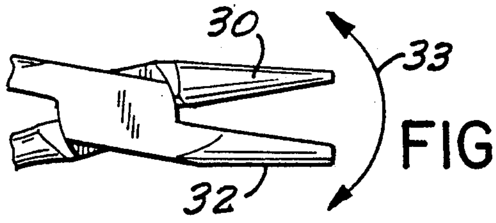
FIG. 4
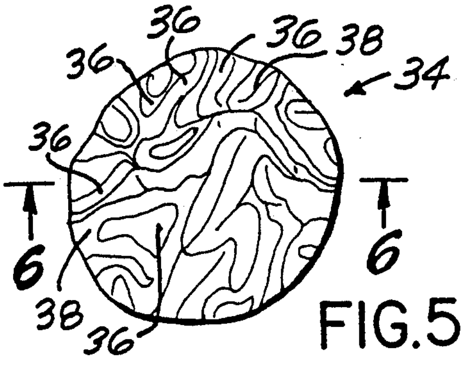
FIG. 5
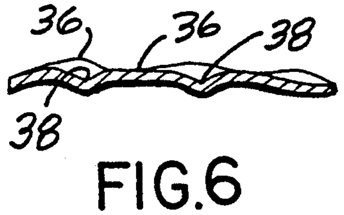
FIG. 6

METHODS OF MAKING THIN METAL FOIL JEWELRY

BACKGROUND OF THE INVENTION

This invention relates to foil jewelry and a method of making foil jewelry and in particular to foil jewelry made from thin metal foil. The method permits thin metal foil which is normally too flexible to be used for jewelry to be shaped into unique designs, which designs impart rigidity and strength to the foil.

The jewelry industry is highly competitive and lower cost attractive jewelry is sought by the consumer. The price of jewelry made of precious metals is highly dependent on the metal weight of the final product. This has lead to the need to develop jewelry with less metal weight which has the look, strength and feel of jewelry with more weight.

One example of lowering the metal weight of jewelry is to form hollow rope chain rather than solid rope chain. The hollow rope chain has up to 60 percent less metal than its solid counterpart, but with the look, feel and hardness of a solid rope chain. As the price of precious metals increases the need for attractive jewelry with less precious metal requirement is needed.

This has prompted jewelry manufacturers to seek methods of creating jewelry that looks aesthetically similar to heavier products with similar strength characteristics. Therefore, by way of example in the gold jewelry industry reducing weight of gold is an important cost reduction goal. The problem has been that as the gold material is reduced in thickness to reduce its weight, the flexibility of the gold increases and the final product looses its rigidity.

What is needed is a thin precious metal piece of jewelry which has the look and feel of its heavier counterpart and a method of making the jewelry which assures a consistently rigid and strong product.

SUMMARY OF THE INVENTION

Accordingly, it is an object of the present invention to provide an improved jewelry item made from thin metal foil.

Another object of the present invention is to provide a rigid, stable piece of jewelry from a thin planar foil.

A further object of the present invention is to provide a method of imparting shapes to a thin planar foil, which shaping strengthens the foil.

A still further object of the present invention is to provide a method of shaping a thin planar foil which includes finishing the edges of the foil to aesthetically affect appearance and add rigidity to the item.

Briefly, in accordance with the present invention a thin precious metal foil such as gold of an arbitrary peripheral shape is taken and is crimped randomly. The crimping is typically accomplished using a tool such as pliers or other tool which can be used for crimping. By way of example, here is shown a plier which has a lower jaw with a semicircular trough and an upper jaw with a round tapered core which fits within the trough. The foil is placed between the jaws of the plier and the plier is squeezed to form generally semicircular crimps in the foil. This initial crimping is arbitrarily done to the foil with crimps overlapping to form unique shapes with peaks and valleys. The crimps increase the rigidity of the foil.

The foil is next bent arcuately by gripping the foil with a plier and both crimping and twisting the plier.

The arcuate bending adds strength to the initially crimped foil and increases its rigidity. The arcuate bending increases the peaks and valleys and adds new random shapes which are aesthetic.

The shaped foil may be used at this stage as jewelry, for example, a pin, an earing or a part of a bracelet. Alternatively, the shaped foil may be further processed.

In one embodiment the edges of the foil are melted to form a bead to add further rigidity to the foil and a different aesthetic appearance. In another embodiment, the edges are bent to form a skirt which can receive a backing. In a further embodiment, holes are burnt into the foil to create a beaded hole which adds rigidity to the foil and changes its appearance. In yet a further embodiment the surface is sandblasted and then the piece is polished thereby giving a shiny finish to the peaks and a matte finish to the valleys.

The aforementioned objects, features and advantages of the invention will, in part, be pointed out with particularity and will, in part, become obvious from the following more detailed description of the invention taken, in part, with the drawings which form an integral part thereof.

BRIEF DESCRIPTION OF THE DRAWING

In the drawings:

FIG. 1 is a top view looking down at a piece of metal foil with an arbitrary peripheral shape;

FIG. 2 is a cross-sectional view of the foil shown in FIG. 1, taken along line 2—2;

FIGS. 3*a*, 3*b* and 3*c* show a tool for fashioning the foil shown in FIG. 1 into a piece of jewelry;

FIG. 4 is a fragmentary view of another tool for fashioning jewelry;

FIG. 5 is a top view of the foil shown in FIG. 1 after having been randomly crimped;

FIG. 6 is a cross-sectional view of the foil shown in FIG. 5 taken along line 6—6;

In the various figures of the drawings like reference characters designate like parts.

DETAILED DESCRIPTION OF THE PREFERRED EMBODIMENT

Figure 7:
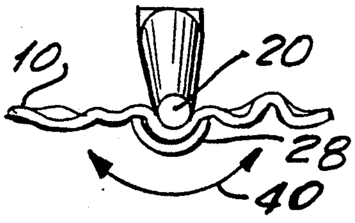
FIG. 7 is an end view of the jaws of the crimping tool shown in FIG. 3 engaging a piece of foil.

Referring now to the drawings, in FIG. 1 there is shown a thin metal foil generally designated as 10 having an arbitrary peripheral shape 12. The foil is made of a metal such as a precious metal which can be gold or the like, for the purposes of the description of the invention. As shown in cross-section in FIG. 2, the foil 10 is thin. The foil is in the range of 0.003 to 0.025 inches in thickness and when the foil is gold 0.004 inches has been found to be a suitable thickness. A suitable thickness is one which can be easily shaped into a unique jewelry design with adequate rigidity and strength to withstand damage in ordinary use.

Referring to FIGS. 3*a*, 3*b* and 3*c*, one example of a crimping tool generally designated 14 is shown. The tool 14 is by way of illustration shown to be a plier with crimping jaws 16 and 18. Jaw 16 is a round core which is tapered and becomes progressively larger in circumference beginning at the right end 20 as one moves to the left toward handles 22 and 24. Jaw 18 has a semicircular trough 26 the bottom of which is shown dotted. Trough 26 becomes progressively larger in diameter beginning at the right end 28 as one moves to the left toward the handles 22 and 24 so that the tapered core 16 fits within the trough 26. As shown in FIG. 7, the right ends 20 and 28 of the tapered core 16 and the trough 28, respectively, nest within one another.

In practice, foil 10 is gripped by crimping jaws 16 and 18. Closing of the jaws by squeezing handles 22 and 24 of the plier 14 together causes a semicircular crimp in the foil as shown in FIG. 7. These initial crimps are randomly formed by merely closing the plier multiple times on the foil in different places. By forming multiple crimps which overlap, the crimps lose their semicircular shape and take on random curves with peaks and valleys.

Referring to FIG. 4, an alternate pair of crimping jaws 30 and 32 are shown. The jaws are flat and are similar to those on needle nose pliers. Round jaws may also be used, but will impart a different aesthetic look to the foil. The initial crimps can also be made by jaws 30 and 32 by using an up and down rocking motion in the direction of arrows 33 to deform the foil and begin to render it non-planar. The invention will be described using the plier 14, with the pair of jaws shown in FIGS. 3 and 4, but other devices including fully automated crimping device can be used.

Referring to FIG. 5, foil 34 has been initially crimped as described and has multiple peaks 36 and valleys 38. Foil 34 shown in cross-section in FIG. 6, is still substantially planar. The initial crimps begin to add rigidity and stability to the foil 34. In addition, the peaks and valleys are randomly dispersed and interim peaks and valleys are formed between other peaks and valleys, resulting in unique designs.

In order to complete the design and to further add rigidity to the foil, the jaws 20 and 28, or 30 and 32, are again randomly placed over existing crimps and closed. However, this time, with the jaws closed as shown in FIG. 7, the plier is twisted in the directions of the arrows 40. The twisting creates new crimps and bends in the foil which randomly intersect with the previously formed peaks and valleys and in addition causes the foil 34 to assume an arcuate shape rather than the substantially planar shape.

Figure 8:
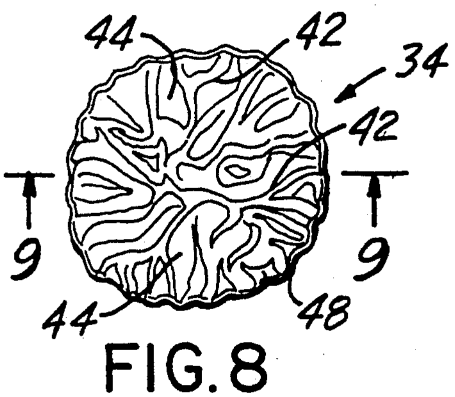
FIG. 8 is a top view of a completed jewelry design made in accordance with the process of the present invention.
Figure 9:
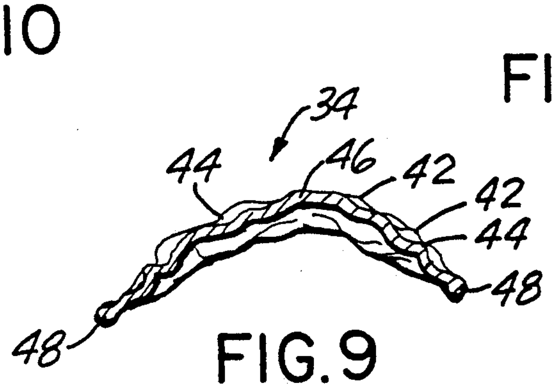
FIG. 9 is a cross-sectional view of the item of jewelry shown in FIG. 8, taken along line 9—9.

Referring to FIG. 8, foil 34 which has been processed by both the initial crimping step of FIG. 5 as well as the crimping and twisting step, now has peaks 42 and valleys 44 with fairly sharp high points and low points so that the peaks and valleys resemble creases in the foil. The walls coming off the peaks are often steep. These more pronounced peaks and valleys render the foil 34 much more rigid and stable. As viewed in cross-section in FIG. 9, foil 34 is now arcuate with the high point 46 in the vicinity of the mid-point. The arcuate shape also adds to the rigidity of the foil and renders it quite resistant to deformation and damage. Also, the arcuate shape is quite pleasing to the eye. The shaped foil 34 as shown in FIGS. 8 and 9 may be used as jewelry at this point. Shaped foil 34 with appropriate attachments could be an earing, a pin or part of a necklace.

The foil 34 can be further finished by heating the periphery to melt the outer edge so that a smooth bead 48 is formed. The bead 48 is thicker than the foil and imparts further rigidity and strength to the foil as well as a different look. The melting of the edge also provides for an irregular perimeter which also provides for a more aesthetic appearance.

Figure 10:
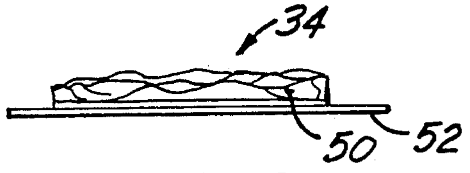
FIG. 10 is a piece of jewelry with a skirt formed to facilitate attachment to a backing.
Figure 11:
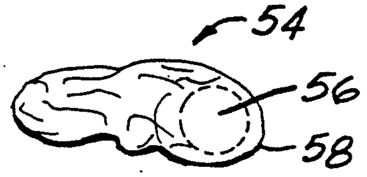
FIG. 11 is a piece of jewelry made in accordance with the invention and having a flat surface for receiving a stone.

Alternatively, as shown in FIG. 10, the foil 34 can have the edge bent downward to form a skirt 50. The skirt 50 can be used to attach the foil 34 to a backing 52 for additional support. The backing should preferably be of a thicker material. As shown in FIG. 11, a foil 54 can be finished with an unbent flat area 56. The flat area 56 can then be used to mount a stone such as a hemispherical pearl (not shown). To secure the stone all that need be done is to bend the edge 58 of the foil 54 to retain the stone. This provides secure retention without the need of forming a pronged seat.

Figure 12:
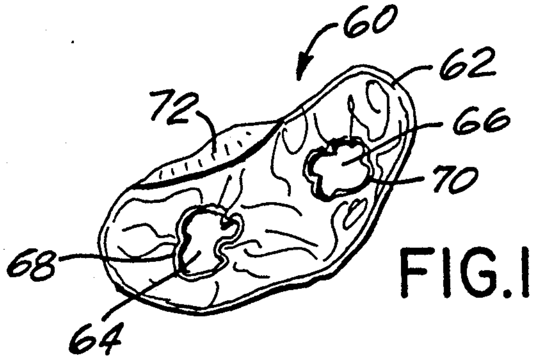
FIG. 12 is another design made in accordance with the present invention.

Another technique for adding beauty to the article of jewelry is shown in FIG. 12. The foil 60 has a beaded periphery 62 as before. In addition holes 64 and 66 are burned into the foil. The edges 68 and 70 of the holes also become beaded and irregular in the process and add rigidity to the foil and a different look. In addition an accent piece 72 such as a silver strip yellow gold, white gold or the like, can be adhered to the foil.

Figure 13:
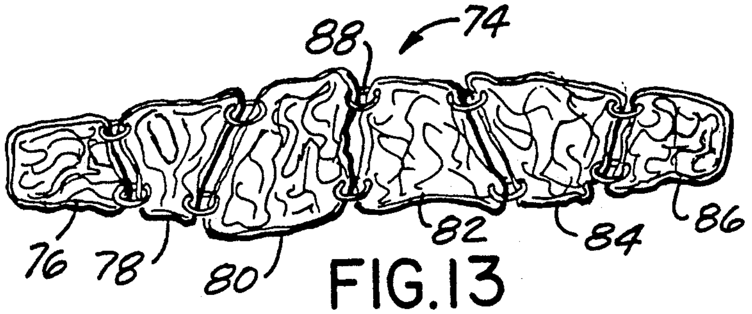
FIG. 13 is a bracelet made in accordance with the present invention.

A bracelet 74 consisting of finished foil pieces 76 through 86 is shown in FIG. 13. The pieces are drilled to have small holes (not shown) through which connecting rings 88 are inserted to link the foil pieces. Foil pieces 76 and 86 are fitted with a clasp (not shown) for holding the bracelet on a wrist.

There are many alternative finishing steps which could be taken. Examples of such steps are sand blasting the entire piece and then polishing the peaks. This gives a shiny nugget finish to the peaks and a matte finish to the valleys.

There has been described a preferred embodiment of the invention. However, it should be understood that various changes and modifications may be made thereto without departing from the spirit and scope of the invention.

What is claimed is:

1. The process of manufacturing foil jewelry from a thin metal foil comprising the steps of:

providing a thin metal foil having a peripheral shape;

crimping the foil to form a crimp in the foil surface; and repeating the crimping step randomly on the foil to form peaks and valleys on the foil surface to add rigidity to the foil and give the foil a unique aesthetic appearance, and wherein the crimping comprises the steps of:

moving a crimping tool with a core and a trough over the periphery of the foil so that the core is on one side of the foil and the trough is on the other side of the foil; and moving the core into the trough to crimp the foil therebetween to form a crimp in the foil.

2. The process as in claim 1, wherein additional crimping is performed comprising the steps of:

positioning the core and trough on opposite sides of the foil on tops of the previously formed crimps;

moving the core into the trough with the foil therebetween to form additional crimps in the foil;

rotating the core and trough in unison to bring the additional crimps out of the plane of the foil to form peaks and valleys; and repeating the last mentioned positioning, moving and rotating steps randomly on the foil to form further peaks and valleys and to cause the foil to assume an arcuate shape to add further rigidity to the foil and to change the appearance of the foil.

3. The process as in claim 1 wherein the foil is selected with a thickness in the range of 0.003 to 0.025 inches.

4. The process as in claim 3 wherein the foil is selected with a thickness of about 0.004 inches.

5. The process as in claim 1 and further comprising the step of sandblasting the foil and then polishing the peaks whereby the peaks become shiny and the valleys remain matte.

6. The process of manufacturing foil jewelry from a thin metal foil comprising the steps of:

providing a thin metal foil having a peripheral shape;

crimping the foil to form a crimp in the foil surface; and repeating the crimping step randomly on the foil to form peaks and valleys on the foil surface to add rigidity to the foil and give the foil a unique aesthetic appearance, and wherein the crimping comprises the steps of:

moving a crimping tool with a pair of jaws over the periphery of the foil so that one jaw is on one side of the foil and the other jaw is on the other side of the foil;

closing the jaws with the foil therebetween; and moving the jaws in a rocking motion up and down to form a crimp.

7. The process as in claim 6, wherein additional crimping is performed comprising the steps of:

positioning the jaws on opposite sides of the foil on top of the previously found crimps;

closing the jaws with the foil therebetween to form additional crimps;

rotating the jaws in unison to bring the additional crimps out of the plane of the foil to form peaks and valleys; and repeating the steps of positioning, closing and rotating randomly on the foil to form further peaks and valleys and to cause the foil to assume an arcuate shape to add further rigidity to the foil and to change the appearance of the foil.

8. The process of manufacturing foil jewelry from a thin metal foil comprising the steps of:

providing a thin metal foil having a peripheral shape;

crimping the foil to form a crimp in the foil surface; and repeating the crimping step randomly on the foil to form peaks and valleys on the foil surface to add rigidity to the foil and give the foil a unique aesthetic appearance, and wherein additional crimping is performed comprising the steps of:

crimping the foil on top of the previously formed crimps to form additional crimps in the foil; and rotating the additional crimps to bring the sides of the additional crimps out of the plane of the foil to form peaks and valleys;

repeating the last mentioned crimping and rotating step randomly on the foil to form further peaks and valleys and to cause the foil to assume an arcuate shape to add further rigidity to the foil and to change the appearance of the foil.

9. The process as in claim 8 comprising the further step of heating the periphery of the foil to melt the periphery to form an irregular periphery with a bead on the periphery to further enhance the rigidity of the foil.

10. The process as in claim 9 comprising the further step of burning a hole in the foil to form an irregular edge peripheral to the hole and a bead on the edge of the hole to add rigidity to the foil.

11. The process as in claim 8 comprising the further step of bending the periphery of the foil to form a skirt for attachment to a backing.

12. The process as in claim 8 wherein a flat area is left on the foil for mounting accessories on the flat area.

13. The process as in claim 12 wherein the edges of the flat area are upturned to retain the accessory securely on the flat area.

* * * * *